United States Patent
Riedmiller et al.

(10) Patent No.: US 9,552,845 B2
(45) Date of Patent: Jan. 24, 2017

(54) AUTOMATIC GENERATION OF METADATA FOR AUDIO DOMINANCE EFFECTS

(75) Inventors: Jeffrey C. Riedmiller, Penngrove, CA (US); Regunathan Radhakrishnan, San Bruno, CA (US); Hannes Muesch, Oakland, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 662 days.

(21) Appl. No.: 13/501,086

(22) PCT Filed: Oct. 5, 2010

(86) PCT No.: PCT/US2010/051513
§ 371 (c)(1),
(2), (4) Date: Apr. 9, 2012

(87) PCT Pub. No.: WO2011/044153
PCT Pub. Date: Apr. 14, 2011

(65) Prior Publication Data
US 2012/0201386 A1   Aug. 9, 2012

Related U.S. Application Data

(60) Provisional application No. 61/250,457, filed on Oct. 9, 2009.

(51) Int. Cl.
*H04N 11/00* (2006.01)
*H03G 1/02* (2006.01)
(Continued)

(52) U.S. Cl.
CPC .............. *G11B 27/11* (2013.01); *G10L 19/008* (2013.01); *G10L 19/167* (2013.01);
(Continued)

(58) Field of Classification Search
CPC .................................... H03G 3/00; H04S 7/00
(Continued)

(56) References Cited

U.S. PATENT DOCUMENTS 4,811,404 A * 3/1989 Vilmur ................ G10L 21/0208
327/552
5,189,562 A   2/1993 Greene
(Continued)

FOREIGN PATENT DOCUMENTS

CN   101199015   6/2008
EP   1070438   1/2001
(Continued)

OTHER PUBLICATIONS

Doenges, P.K., et al., "MPEG-4: Audio/Video and Synthetic Graphics/Audio for Mixed Media" 1997 published by Elsevier B.V.
(Continued)

*Primary Examiner* — George Monikang (57) ABSTRACT

Metadata comprising a set of gain values for creating a dominance effect is automatically generated. Automatically generating the metadata includes receiving multiple audio streams and a dominance criterion for at least one of the audio streams. A set of gains is computed for one or more audio streams based on the dominance criterion for the at least one audio stream and metadata is generated with the set of gains.

24 Claims, 6 Drawing Sheets

(51) Int. Cl.
*G11B 27/11* (2006.01)
*G10L 19/008* (2013.01)
*G10L 19/16* (2013.01)
*G11B 27/031* (2006.01)
*G11B 27/10* (2006.01)
*G11B 27/28* (2006.01)
*G11B 27/32* (2006.01)

(52) U.S. Cl.
CPC .......... *G11B 27/031* (2013.01); *G11B 27/105* (2013.01); *G11B 27/28* (2013.01); *G11B 27/322* (2013.01)

(58) Field of Classification Search
USPC .................................. 381/56, 104, 106, 107
See application file for complete search history.

(56) References Cited

U.S. PATENT DOCUMENTS

| | | | |
|---|---|---|---|
| 5,633,938 | A | 5/1997 | Porter, III |
| 6,108,415 | A | 8/2000 | Andrea |
| 7,328,151 | B2 | 2/2008 | Muesch |
| 7,415,120 | B1 | 8/2008 | Vaudrey |
| 7,483,831 | B2 | 1/2009 | Rankovic |
| 7,525,034 | B2 | 4/2009 | Nease |
| 7,532,258 | B1 | 5/2009 | Galgano |
| 7,627,480 | B2* | 12/2009 | Ojanpera ............ H04S 1/007 381/2 |
| 2002/0006137 | A1 | 1/2002 | Rabenko |
| 2004/0030550 | A1 | 2/2004 | Liu |
| 2004/0138873 | A1 | 7/2004 | Heo |
| 2005/0141737 | A1 | 6/2005 | Hansen |
| 2006/0126859 | A1 | 6/2006 | Elberling |
| 2007/0015457 | A1 | 1/2007 | Krampf |
| 2007/0274539 | A1* | 11/2007 | Boss et al. .................. 381/107 |
| 2008/0040759 | A1 | 2/2008 | She |
| 2008/0080722 | A1* | 4/2008 | Carroll .................... H04R 5/04 381/109 |
| 2008/0304670 | A1 | 12/2008 | Breebaart |
| 2008/0317268 | A1 | 12/2008 | Nordahn |
| 2009/0208188 | A1 | 8/2009 | Yahata |
| 2010/0014679 | A1* | 1/2010 | Kim ...................... G10L 19/008 381/23 |

FOREIGN PATENT DOCUMENTS

| | | |
|---|---|---|
| EP | 1312162 | 5/2003 |
| WO | 2005099252 | 10/2005 |
| WO | 2006135165 | 12/2006 |
| WO | 2007014136 | 2/2007 |
| WO | 2008/100503 | 8/2008 |
| WO | 2008/106036 | 9/2008 |
| WO | 2009034536 | 3/2009 |

OTHER PUBLICATIONS

Rhebergen, K.S., et al., "A Speech Intelligibility Index-Based Approach to Predict the Speech Reception Threshold for Sentences in Fluctuating Noise for Normal-Hearing Listeners" J. Acoust Soc. Am. vol. 117, Issue 4, pp. 2181-2192 (2005) 12 pages.

Mitchell, D.P., et al., "Moving Beyond the White Cane: building an Online Learning Environment for the Visually Impaired Professional" 2000, vol. 3, No. 1-2, pp. 117-124.

Pledge, J.G.W., "The Application of Speech Coding to AUDETEL Services for Visually Impaired People" 1993, published by Institution of Electrical Engineers.

Slashchev, V.N., et al., "Effect of MOdes of Operation of Speech Detectors on the Intelligibility" published in Dec. 1976; Telecommunications and Radio Engineering, vol. 30-31, n 11, p. 69-71.

Turner, J.M., et al., "Using Audio Description for Indexing Moving Images" 2004, Knowledge Organization 31(4), 222-230.

* cited by examiner

AUTOMATIC GENERATION OF METADATA FOR AUDIO DOMINANCE EFFECTS

CROSS-REFERENCE TO RELATED APPLICATIONS

This application claims priority to U.S. Provisional patent application No. 61/250,457 filed 9 Oct. 2009, which is hereby incorporated by reference in its entirety.

TECHNOLOGY

The present invention relates generally to dominance effects. More specifically, embodiments of the present invention relate to automatically generating metadata for audio dominance effects.

BACKGROUND

Broadcast studios are often required to deliver two or more audio streams associated with an audio and/or video program. For example, the primary audio stream may include the primary dialogue, music, and effects for a program, and a secondary audio stream may include descriptive audio, e.g., speech intended for visually impaired audiences.

An audio stream may or may not be active at all times. For example, the secondary audio stream, including the descriptive audio, may be active during periods of setting up and describing a scene (or a scene change) in a program. However, if the secondary audio stream is active at the same time as the primary audio stream, the secondary audio stream may not be intelligible to a user over the primary audio stream.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

The example embodiments described herein relate to automatically generating audio dominance effects. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid obscuring the present invention.

Example embodiments are described herein according to the following outline:

1.0 General Overview
2.0 Architectural and Functional Overview
3.0 Example Flow Diagram
4.0 Implementation Mechanisms—Hardware Overview
5.0 Equivalents, Extensions, Alternatives, and Miscellaneous

1.0 General Overview

In a possible embodiment, metadata comprising gain values for one or more audio streams to create a dominance effect are automatically generated. Automatically generating the metadata may include: receiving a first audio stream and a second audio stream, computing a set of gains for at least one of the first audio stream and the second audio stream to create a dominance effect of the second audio stream over the first audio stream, and generating metadata comprising the set of gains for at least one of the first audio stream and the second audio stream.

In a possible embodiment, the set of gains is computed based on a dominance criterion of the second audio stream over the first audio stream. Examples of the dominance criterion include a loudness ratio between the first audio stream and the second audio stream, and a power ratio between the first audio stream and the second audio stream. Computing the set of gains may include deriving the loudness values of at least one of the first audio stream and the second audio stream. The dominance criterion may include an intelligibility criterion of the second audio stream, where the set of gains is computed for one or more audio streams to meet the intelligibility criterion of the second audio stream. The intelligibility criterion may be a speech intelligibility value such as a speech intelligibility index. The dominance criterion may vary based on frequency sub-bands.

In a possible embodiment, the set of gains is computed based on whether the first audio stream includes speech or non-speech content. The set of gains may vary depending on a confidence level associated with whether the first audios stream includes speech or non-speech content. Different sets of gains may be computed for different frequency sub-bands. In an embodiment, the set of gains may be derived under the constraint that the loudness of the combined first audio stream and second audio stream, after application of corresponding set of gains, does not exceed the larger of the loudness values of the first audio stream and the second audio stream.

In a possible embodiment, overlapping signal time intervals may be identified when multiple audio streams are active. The set of gains may be computed only when multiple audio streams are active. A neutral or other default gain value may be used when only a single audio stream is active.

Other embodiments of the invention may include a system with functionality to execute the steps described above, a computer readable storage medium comprising instructions, which when executed perform the steps described above, and means for executing the steps described above.

2.0 Architectural and Functional Overview

Examples of possible embodiments, which relate to automatically generating audio dominance effects, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid occluding, obscuring, or obfuscating the present invention.

Figure 1:
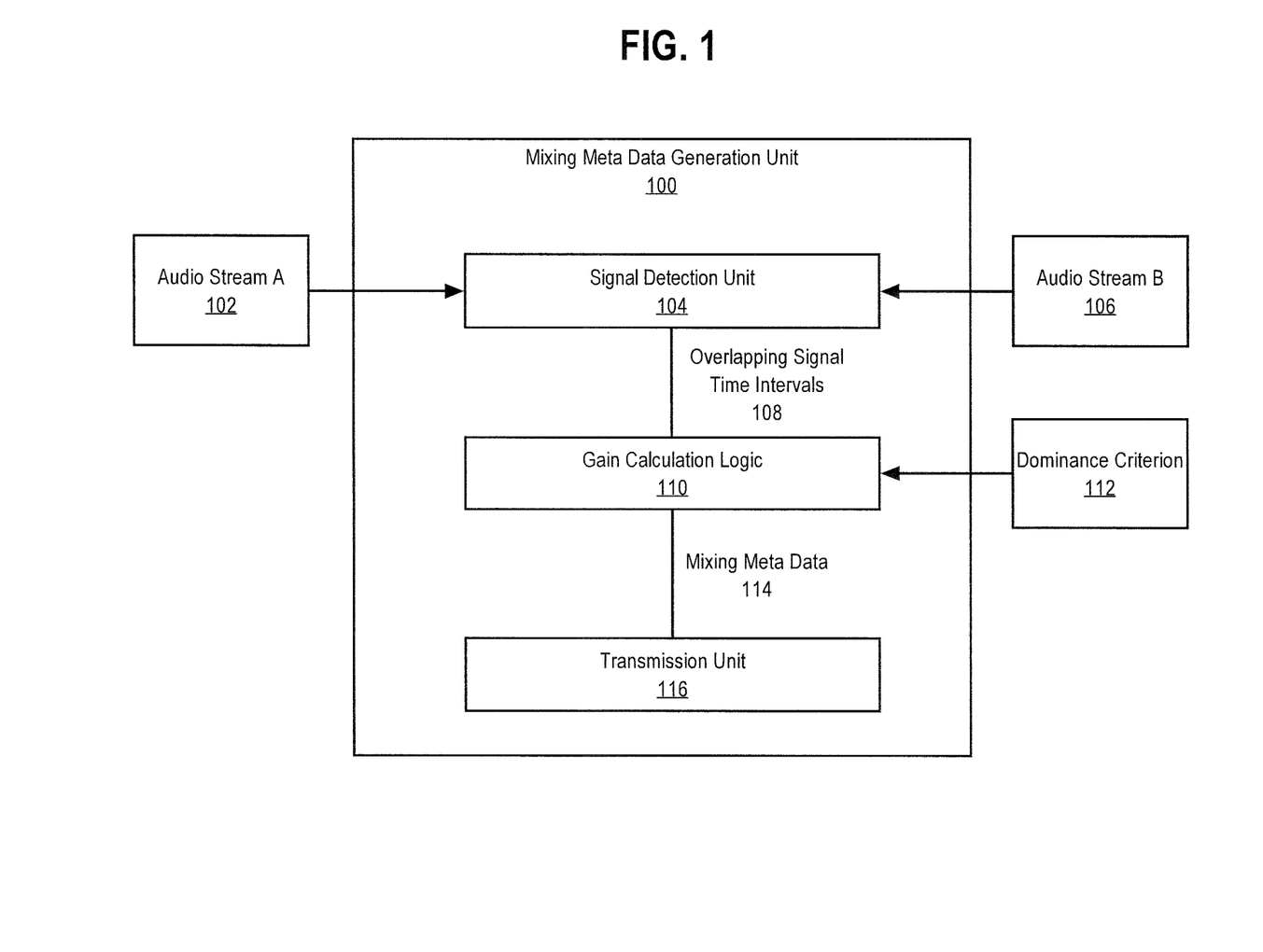
FIG. 1 depicts an example of a metadata generation unit, according to an embodiment.

FIG. 1 illustrates an example of a metadata generation unit (100) in accordance with an embodiment. The metadata generation unit (100) includes hardware and/or software for automatically generating metadata including a set of gains, to be applied to at least one audio stream of two or more audio streams, to create a dominance effect. The metadata generation unit (100) may include codecs (compressors-decompressors/coder-decoder) for the encoding or decoding of digital data streams or signals. In an embodiment, the metadata generation unit (100) may be implemented at a broadcast studio, from which the automatically generated metadata and the corresponding audio streams may be broadcasted. In an embodiment, the metadata generation unit (100) comprises a signal detection unit (104), a gain calculation logic (110), and a transmission unit (116).

Each of these components is described below and may be located on the same device (e.g., a server, mainframe, desktop PC, laptop, PDA, television, cable box, satellite box, kiosk, telephone, mobile phone, etc.) or may be located on separate devices coupled by a network (e.g., Internet, Intranet, Extranet, Local Area Network (LAN), Wide Area Network (WAN), etc.), with wire and/or wireless segments. In one or more embodiments, the metadata generation unit (100) may be implemented using a client-server topology. The metadata generation unit (100) itself may be an enterprise application running on one or more servers, and in some embodiments could be a peer-to-peer system, or resident upon a single computing system. In addition, the metadata generation unit (100) may be accessible from other machines using one or more interfaces, web portals, or any other tool. In one or more embodiments, the metadata generation unit (100) is accessible over a network connection, such as the Internet, by one or more users. Information and/or services provided by the metadata generation unit (100) may also be stored and accessed over the network connection.

In an embodiment, an audio stream (e.g., audio stream A (102) and audio stream B (106)) generally represents any signal that includes an audio portion, which is provided as input to the metadata generation unit (100). The audio stream may be a compressed or uncompressed signal. The audio streams provided as input may be in the same or different formats. Examples of uncompressed formats include waveform audio format (WAV), audio interchange file format (AIFF), Au file format, and Pulse Code Modulation (PCM). Examples of compression formats include lossy formats such as Dolby Digital (also known as AC-3), enhanced Dolby Digital, Advanced Audio Coding (AAC), Windows Media Audio (WMA) MPEG-1, and Audio Layer 3 (MP3) and lossless formats, such as Dolby TrueHD. In an embodiment, an audio stream may correspond to one or more channels in a multi-channel program stream. For example, audio stream A (102) may include the left channel and the right channel, and audio stream B (106) may include the center channel. The selection of example audio streams (e.g., format, content, number) in this description may be made for simplicity and concise unity and, unless expressly stated to the contrary, should not be construed as limiting an embodiment to particular audio streams as embodiments of the present invention are well suited to function with any media format/content.

In an embodiment, an audio stream may represent a primary audio stream for media content which includes music, sound effects, primary dialogue, etc. An audio stream may also represent only a portion of the primary audio (e.g., one or more of: music, sound effects, primary dialogue, etc.) associated with media content. An audio stream may represent any additional and/or alternate audio content associated with media content. For example, a secondary audio stream for visually impaired audiences may represent descriptive audio (e.g., speech) which describes a scene, scene change, action sequence, or any other descriptive information associated with media content.

Audio stream A (102) and audio stream B (106) may represent any two audio streams, where a gain set applied to at least one audio stream creates a dominance effect of one audio stream over another audio stream. Although two audio streams are shown in FIG. 1, embodiments are applicable to any number of audio streams, where a set of gains may be calculated and applied to at least one of the audio streams to create a dominance effect.

In a possible embodiment, the signal detection unit (104) corresponds to software and/or hardware used for detecting one or more active signals. For example, the signal detection unit (104) may determine whether a signal is active based on energy levels. For example, the signal detection unit (104) may be configured to determine that a signal is active if the energy level of the signal meets an energy level threshold. In an embodiment, the signal detection unit may include functionality to identify overlapping signal time intervals (108) during which two or more signals (e.g., audio stream A (102), audio stream B (106), etc.) are concurrently active. In an embodiment, one signal (e.g., a primary signal) may always be active/ON and the signal detection unit (104) may only be used to detect the presence of additional signals.

The signal detection unit (104) may refer to a single processing module or a group of processing modules that may be configured to accept two or more electrical signals (e.g., audio stream A (102) and audio stream B (106)) as input. The signal detection unit (104) may include functionality to determine a frequency of the electrical signal for any given frame or at any given time. For example, the signal detection unit (104) may determine frequency sub-bands active for a given audio frame. The signal detection unit (104) may include functionality to detect whether a signal is active or inactive for any given frame. A signal may be defined as active when the signal energy or amplitude in a frame exceeds a threshold and inactive when the signal energy or amplitude in the frame does not exceed the threshold. Alternatively, a signal frame may be defined as active only when the signal is of a particular type (e.g., speech) and inactive when the signal is of a different type (e.g., music). Different criteria for determining whether a signal is active or inactive may be used for different audio signals. The signal detection unit (104) may receive metadata indicating the time intervals when an audio stream is active or inactive. For example, metadata may note that an audio signal is active from audio frame 120 to audio frame 250. The signal detection unit (104) may include functionality to compute the overlapping signal time intervals (108) when two or more audio streams are active.

The signal detection unit (104) may also produce a measure of the likelihood of the signal in one or more audio streams being speech. For example, a classifier may be used to detect speech signals based on features extracted from the input audio, where the classifier is trained using training data collected for speech signals. In an embodiment, a speech value based on features within an audio signal may be computed and the likelihood of the signal being speech is based on the proximity of the speech value to a threshold value indicative of speech. For example, a Gaussian Mixture Model (GMM) may be used to model the probability density function of the features for a particular signal type (e.g., speech). In this example, the number of features m extracted for each audio frame may be represented using an m dimensional random vector Y. The number of Gaussian mixtures K, mixture coefficients π, means μ and variances R for a particular signal type may be learned during training, where $\theta = (\pi, \mu, R)$. The parameters K and θ may also be estimated using Expectation Maximization algorithm. The log of the probability of the entire sequence $Y_n$ (n=1, 2 ... N) including speech may then be given by:

$$\log p_y(y \mid K, \theta) = \sum_{n=1}^{N} \log\left(\sum_{k=1}^{K} p_{y_n}(y_n \mid k, \theta)\pi_k\right) \quad \text{equation (1)}$$

Here N represents the total number feature vectors extracted from the training examples of the particular signal type being modeled and the likelihood of the training data under $k^{th}$ mixture component is computed as shown below:

$$p_{y_n}(y_n \mid k, \theta) = \frac{1}{(2\pi)^{\frac{M}{2}} |R|^{\frac{1}{2}}} e^{-\frac{1}{2}(y_n - \mu_k)^T R_k^{-1} (y_n - \mu_k)} \quad \text{equation (2)}$$

Once the parameters K and have been learnt from the training data, a speech value may be computed using the above two equations for any new input feature vector representing an audio clip (that was not part of the training data) to determine a likelihood that the audio clip includes speech. The speech value and the threshold value indicative of speech may also be used to derive a confidence measure that the audio clip includes speech.

In an embodiment, the gain calculation logic (110) generally represents software and/or hardware that includes functionality to generate metadata (114). The metadata (114) includes a set of gains that may be applied to one or more audio streams (e.g., audio stream A (102) and audio stream B (106)) that result in a dominance effect of at least one audio stream over at least one other audio stream. A gain value applied to an audio stream changes the sound intensity of that audio stream. Changing the sound intensity of one audio stream affects the salience of that audio stream relative to the remaining audio stream. The change in salience is exploited to create the desired dominance effect.

In an embodiment, the gain calculation logic (110) computes the set of gains to be applied to one or more audio streams based on at least one dominance criterion (112). The dominance criterion (112) represents the degree with which at least one audio stream is desired to dominate the remaining audio streams. The terms "dominance" or "to dominate" refer to one audio stream being more "salient" or "easier to perceive" than the remaining audio streams. Dominance may be achieved through loudness differences, differences in the ease with which the speech in an audio stream can be understood or any other measure that affects the degree by which one audio stream is attended to at the expense of the remaining audio streams. The dominance criterion (112) may define a sound pressure difference for a particular audio stream in relation to other audio streams. The dominance criterion (112) may also be a perceptually relevant transformation of a physical measure of the signals, such as a loudness ratio or a measure of speech intelligibility. In an embodiment, the dominance criterion may vary (e.g., based on frequency, based on content, based on priority of particular portions of an audio stream, etc.).

In an embodiment, the dominance criterion (112) may include an intelligibility criterion which represents a minimum level of intelligibility for a particular audio stream. The intelligibility of an audio stream is a value that may be associated with the comprehensibility or understandability of that audio stream. The intelligibility of an audio stream may be directly related to the absolute value of the sound pressure associated with the audio stream. For example, an audio stream may not be loud enough to be heard or may be too loud for optimal intelligiblity even if the audio stream can be heard. The intelligibility of an audio stream may also be related to the relative sound pressure of the audio stream in comparison to other concurrent audio streams. For example, a soft spoken teacher's lecture may be perfectly understandable in a quiet classroom. However, the same soft spoken teacher's lecture may be difficult to understand outside where background noise (e.g., wind, cars, etc.) may drown out the soft spoken teacher's voice. Intelligibility, as referred to herein, is an average listener's ability to decode the meaning of a spoken message. Intelligibility may be predicted from the characteristics of the audio signals according to one or more models (e.g., Speech Intelligibility Index (SII, ANSI S3.5 1997)). In an embodiment, the speech intelligibility index of ANSI S3.5 is taken as a measure of intelligibility.

In an embodiment, the intelligibility criterion defines a level of intelligibility for a particular audio stream when a set of gains is applied to two or more concurrently playing audio streams. For example, the intelligibility criterion may define a minimum level of intelligibility for audio stream B (106) after a set of gains is applied to one or more of audio stream A (102) and audio stream B (106) and the audio streams are concurrently played. In an embodiment, the intelligibility criterion may be defined for active portions of an audio stream. For example, if audio stream A (102) is active throughout the playing of a particular multimedia content and audio stream B (106) is active for a portion of the playing of the particular multimedia content, the intelligibility criterion may define a minimum level of intelligibility of audio stream B (106), whenever audio stream B (106) is active. In an embodiment, the intelligibility criterion may include absolute minimum and/or maximum levels of sound pressure for a particular audio stream. For example, the intelligibility criterion for a particular audio stream may define the minimum and/or maximum decibels at which the audio stream is to be played.

In an embodiment, the gain calculation logic (110) may include functionality to receive the overlapping signal time intervals (108) from the signal detection unit (104) and generate the metadata (114) including gains values, such that the audio streams mixed with corresponding gain values meet the dominance criterion (112) of at least one audio stream. The gain calculation logic (110) may generate metadata that include sets of gain applicable to the entire extent of the audio stream or to overlapping signal time intervals (108). In an embodiment, a neutral gain value (e.g., no increase or decrease) or other default gain value may be used when only one audio stream is active. In an embodiment, the gain calculation logic (110) may include functionality to calculate gains such that a consistent loudness is maintained when one audio stream is active or multiple audio streams are active. For example, the set of gains may be derived under the constraint that the loudness of the combined first audio stream and second audio stream, after application of the set of gains, does not exceed the larger of the loudness values of the first audio stream and the second audio stream.

In an embodiment, the transmission unit (116) generally represents software and/or hardware for transmitting or receiving one or more audio streams. The transmission unit (116) may include functionality to encode and/or decode audio streams to obtain encoded audio stream and decoded audio streams, respectively. For example, the transmission unit (116) may include functionality to obtain the metadata (114) from the gain calculation logic (110) with the corresponding audio streams (e.g., audio stream A (102) and audio stream B (106)). The transmission unit may be configured to encode the audio streams and package the encoded audio streams with the metadata (114) and transmit the package (e.g., a compressed file) to another device.

In an embodiment, the transmission unit on a receiving device (not shown) may include the functionality to decode audio streams that are received. The transmission unit may further include functionality to apply gains according to the metadata (114) to one or more audio streams. The transmission unit may include functionality to stream multiple audio streams with respective gain values separately in a multi-channel audio reproduction system or mix multiple audio streams into a single output (e.g., for stereo or mono).

3.0 Example Flow Diagram

Figure 2:
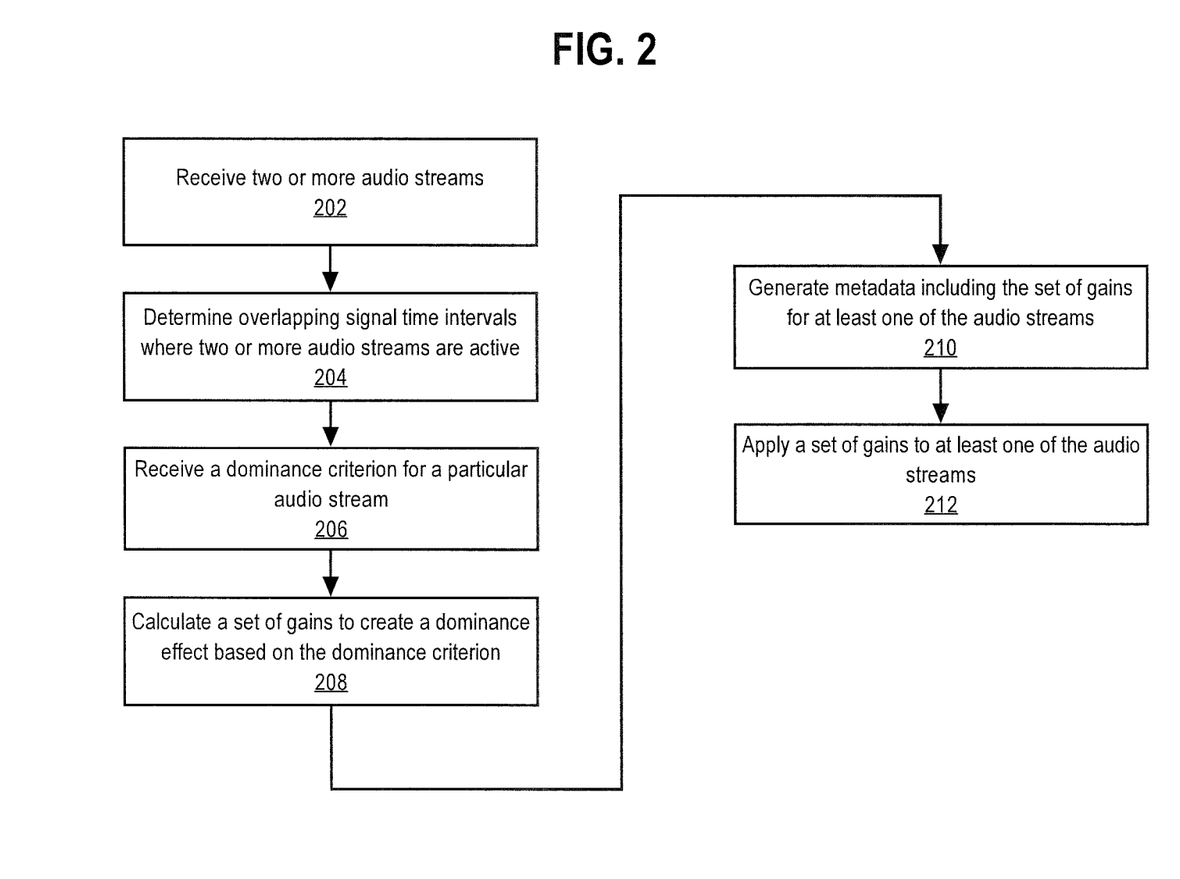
FIG. 2 depicts an example method for creating a dominance effect based on automatically generated metadata.

FIG. 2 illustrates one or more example methods for creating a dominance effect based on automatically generated metadata, according to one or more embodiments. Although a specific number of audio streams may be referred to herein, embodiments of the invention are applicable to any number of audio streams. One or more steps illustrated in FIG. 2 may be modified, rearranged, or omitted all together.

Figure 3A:
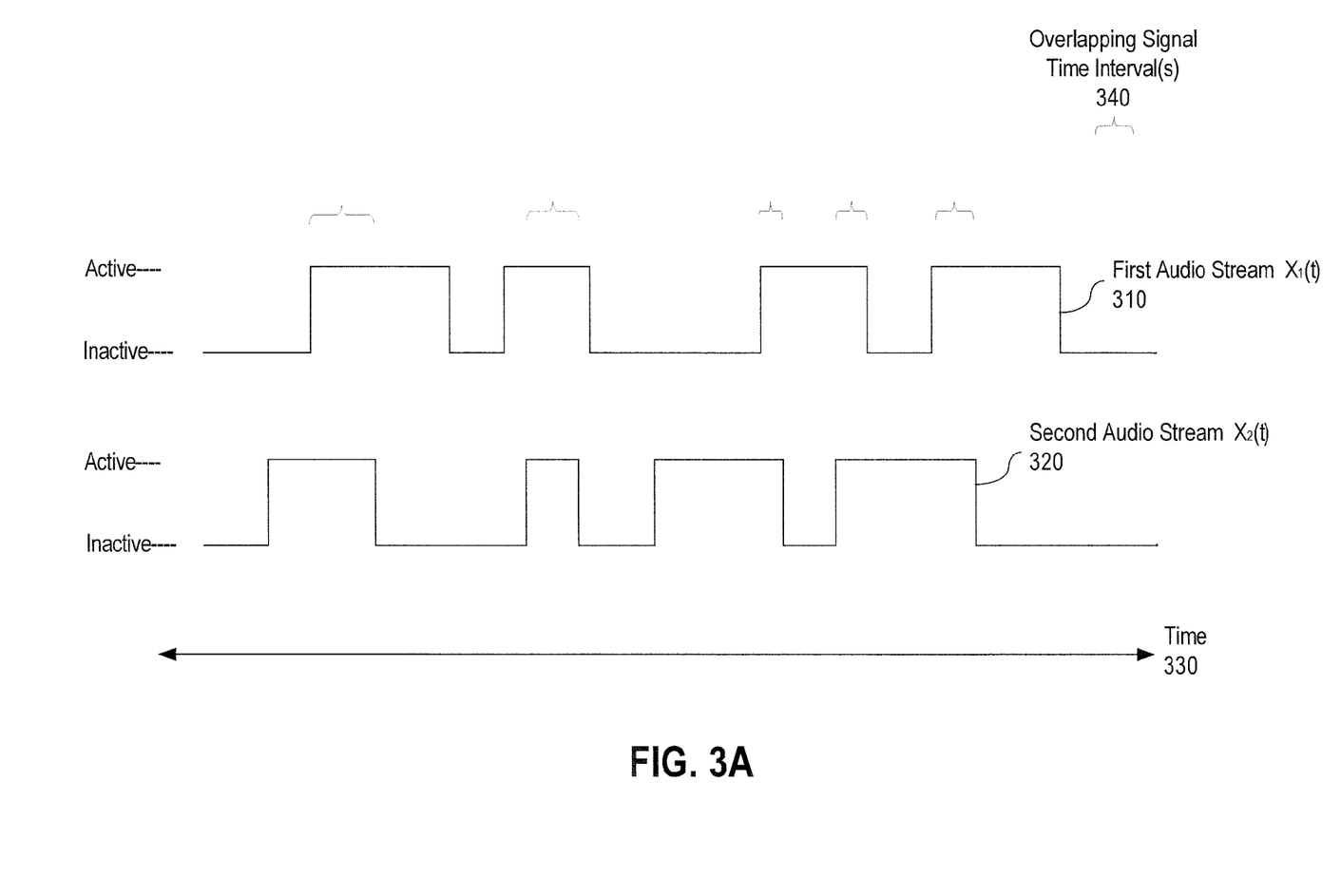
FIG. 3A-FIG. 3B illustrate examples of audio stream signals, according to embodiments.
Figure 3B:
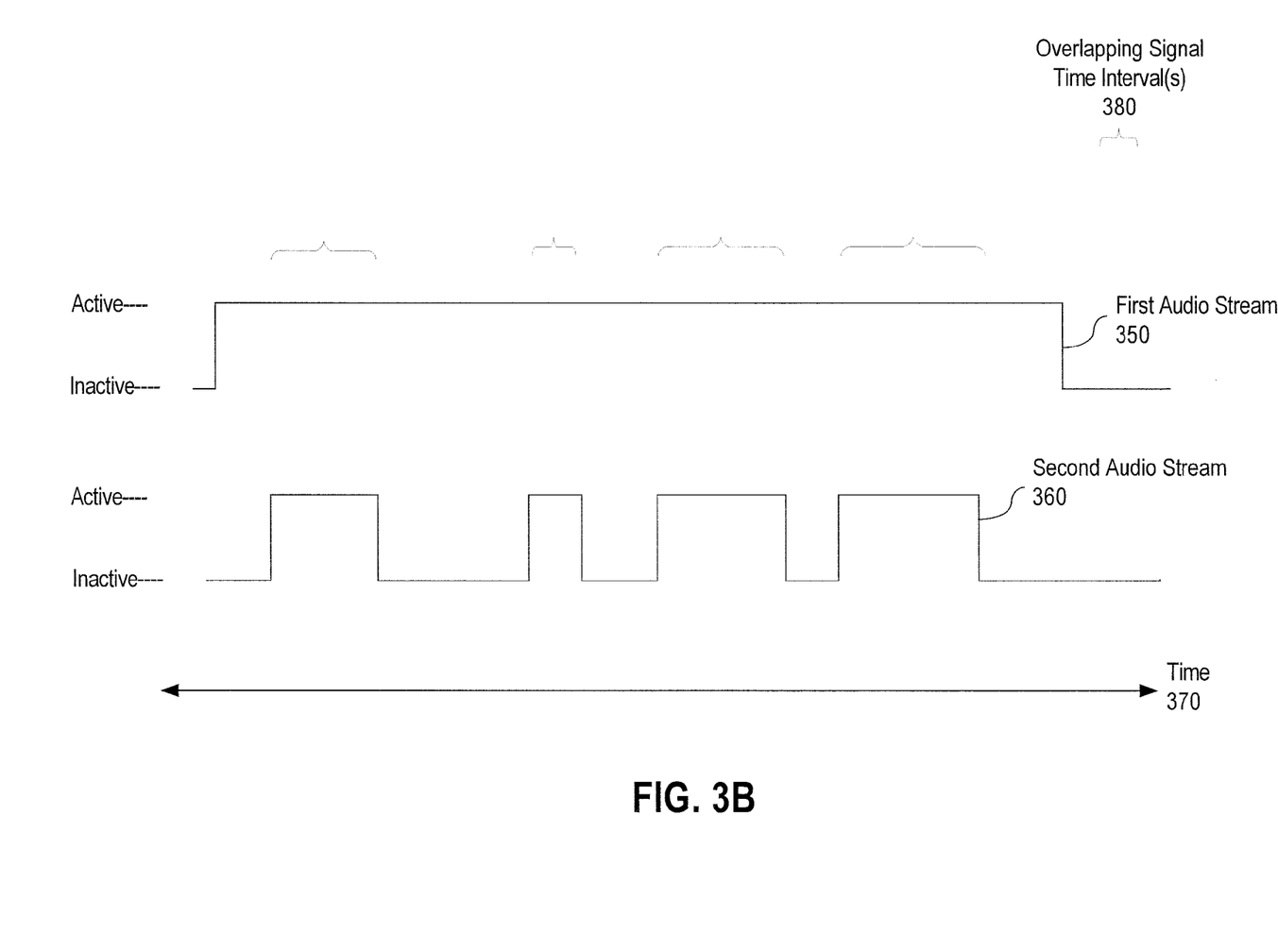

In this example, initially two or more audio streams are received (Step 202). For example, audio streams $X_1(t)$ and $X_2(t)$ may be received as two separate electrical signals, where the audio streams $X_1(t)$ and $X_2(t)$ are synchronized as a function of time 't'. Each of the audio streams may be active at any particular time intervals. Time intervals in which two or more audio streams are active may be referred to herein as overlapping signal time intervals. FIG. 3A and FIG. 3B illustrate examples of audio stream signals, as a function of time. As may be referred to with reference to FIG. 3A, a first audio stream (310) and a second audio stream (320) may both be active and inactive at different times (330) such that there may be overlapping signal time intervals (340) when both audio streams are active. As may be referred to with reference to FIG. 3B, one of the audio streams (e.g., first audio stream (350)) may be active all of the time or a majority of the time, whereas another audio stream (e.g., second audio stream (360)) may be active during small time intervals. Accordingly, in the second example there may be overlapping signal time intervals (380) whenever the second audio stream (360) is active.

In an embodiment, a particular time or audio frame may be entered as an input to determine whether each audio stream is active at that time or audio frame. Based on the determination for each audio stream, frames during which two or more audio streams are active may be identified as part of an overlapping signal time interval (Step 204). In another example, the overlapping signal time intervals may be calculated based on metadata which simply indicates when a corresponding audio stream is active or inactive. For example, any audio frames that are indicated as active for multiple audio streams are identified within the overlapping signal time intervals. Any other suitable method may be used to identify the overlapping signal time intervals when multiple audio streams are active. In an embodiment, detection of an overlapping signal time interval may be altogether omitted. For example, if a primary audio stream is always active, both streams (e.g., the primary audio stream and the secondary audio stream) may be known to be active whenever the secondary audio stream is active.

In an embodiment, a dominance criterion for a particular audio stream may be received, in accordance with one or more embodiments (Step 206). For example, metadata associated with a particular audio stream that indicates the dominance criterion for that particular audio stream may be received. Updates to the dominance criterion may be received randomly, continuously, or periodically. For example, crucial portions of a secondary audio stream may require an increased dominance level indicated by temporary or permanent updates to the dominance criterion.

In an embodiment, a set of gains for one or more audio streams may be calculated based on the dominance criterion (Step 208). Consider an example in which a set of gains are calculated, which when applied to a first audio stream and a second audio stream result in the second audio stream being dominant over the first audio stream. In this example, a set of gains may be computed for each frame of the first audio stream and the second audio stream. Computing the set of gains may include determining the energy over different frequency sub-bands in the second audio stream. Based on the energy over different frequency sub-bands in the second audio stream, a corresponding masking curve may be computed for the second audio stream. The masking curve may then be compared to a spectrum of energy over different frequency sub-bands in the first audio stream. A positive or negative gain may then be calculated across frequency sub-bands for at least one of the first audio stream and the second audio stream, such that the resulting masking curve for the second audio stream is above the resulting spectrum of energy corresponding to the first audio stream, to create a dominance effect according to applicable dominance criterion. The difference between the masking curve for the second audio stream and spectrum of energy corresponding to the first audio stream may vary based on frequency sub-band, as described above. The set of gains may be computed such that the difference between the masking curve for the second audio stream and the spectrum of energy corresponding to the first audio stream may vary based on the content of the first audio stream or the second audio stream. For example, if the first audio stream and the second audio stream are both recognized as speech content, a set of gains may be calculated that result in a large difference between the masking curve of the second audio stream and the spectrum of energy corresponding to the first audio stream. The large difference between the masking curve of the second audio stream and the spectrum of energy corresponding to the first audio stream may be needed as speech in the second audio stream may be difficult to comprehend with concurrent speech in the first audio stream. If the first audio stream is instead determined to be background noise such as road traffic, then the difference between the masking curve of the second audio stream and the spectrum of energy corresponding to the first audio stream may not be as large, since speech in the second audio stream may be easy to comprehend with concurrent background noise in the first audio stream. In an embodiment, determining whether audio stream content is speech may be based on a confidence level (e.g., 80%). The difference between the masking curve for the second audio stream and the spectrum of energy corresponding to the first audio stream may be determined based on the confidence level.

The gain signal computed in the above example may vary drastically between frames and may cause objectionable artifacts. For example, the application of gains may result in abrupt energy changes of one or more audio streams that may be audible and disturbing to a listener. In an embodiment, the gain signal may be low-pass filtered to smooth the gain signal differences from frame to frame as applied to the first audio stream and/or the second audio stream to reduce the abruptness of such energy changes. In an embodiment, the low-pass filtering may be based on a temporal frame rate defined by the audio coding system. Accordingly, gain values (and metadata including the gain values (Step 210)) may be adaptively generated based on the audio codec in use and/or stream type(s). In an embodiment, the gains may be calculated for groups of frames using similar computations as described above, based on average intensities and/or sound pressure across a group of frames.

In an embodiment, the set of gains may be applied to at least one of the audio streams (Step 212). In an embodiment, the audio streams may be mixed (e.g., combined into a single audio stream) based on the set of gains to create a single output in which at least one original audio stream dominates at least one other original audio stream (e.g., for stereo or mono). The set of gains may be applied at a device that receives the audio streams and the set of gains. The set of gains may be applied by the device generating the set of gains and transmitting the single output obtained by applying the gains. The set of gains may also be applied to one or more audio streams, where the audio streams may be streamed separately with respective gains via different channels of a multichannel audio reproductions system. Thus, the dominance effect of at least one audio stream over at least one other audio stream may be created with or without combining the audio streams into a single audio stream. The sound pressure dominance of one audio stream over another audio stream may be referred to herein as one audio stream dominating another audio stream.

4.0 Implementation Mechanisms

Figure 4:
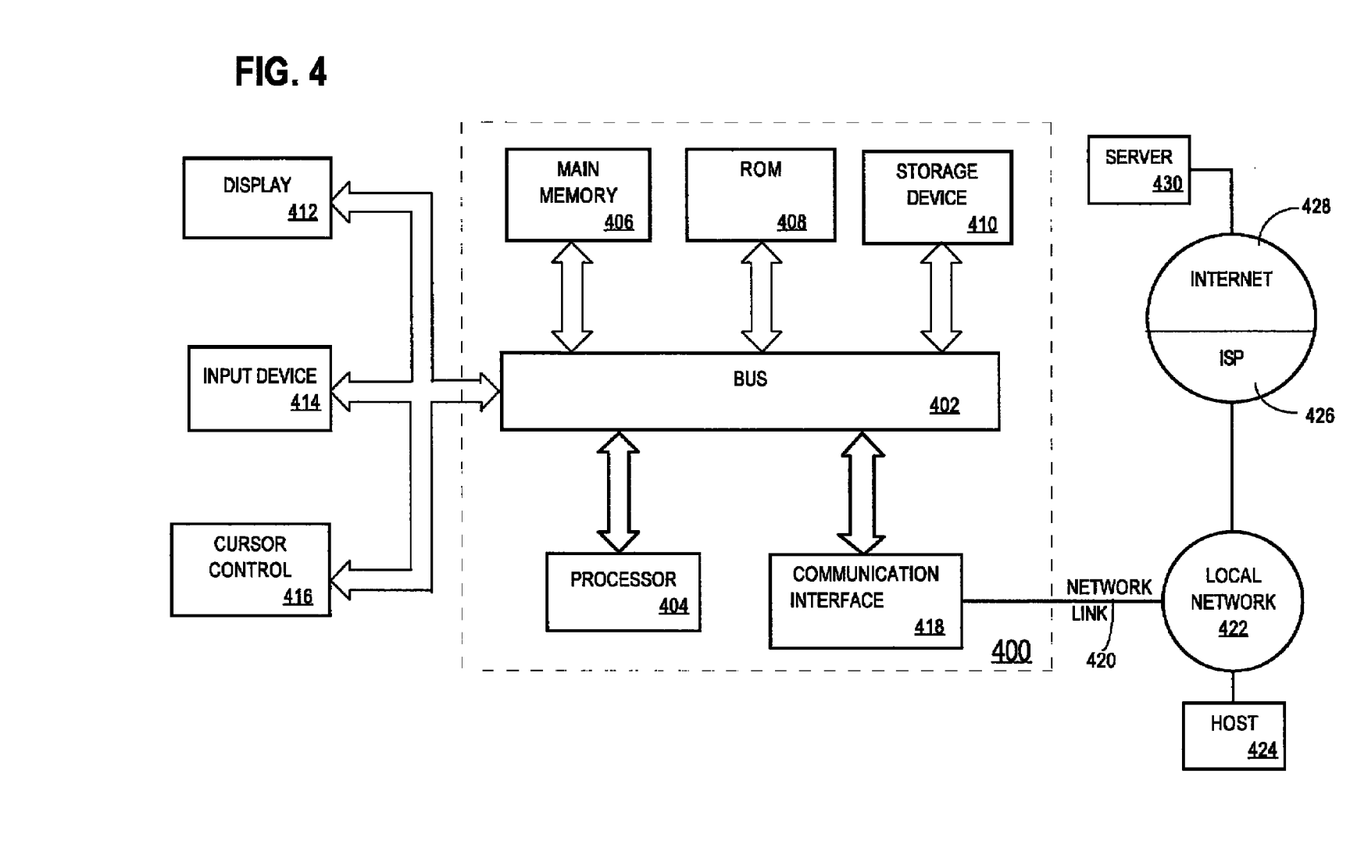
FIG. 4 depicts a block diagram that illustrates a computer system upon which an embodiment may be implemented.

FIG. 4 depicts a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Figure 5:
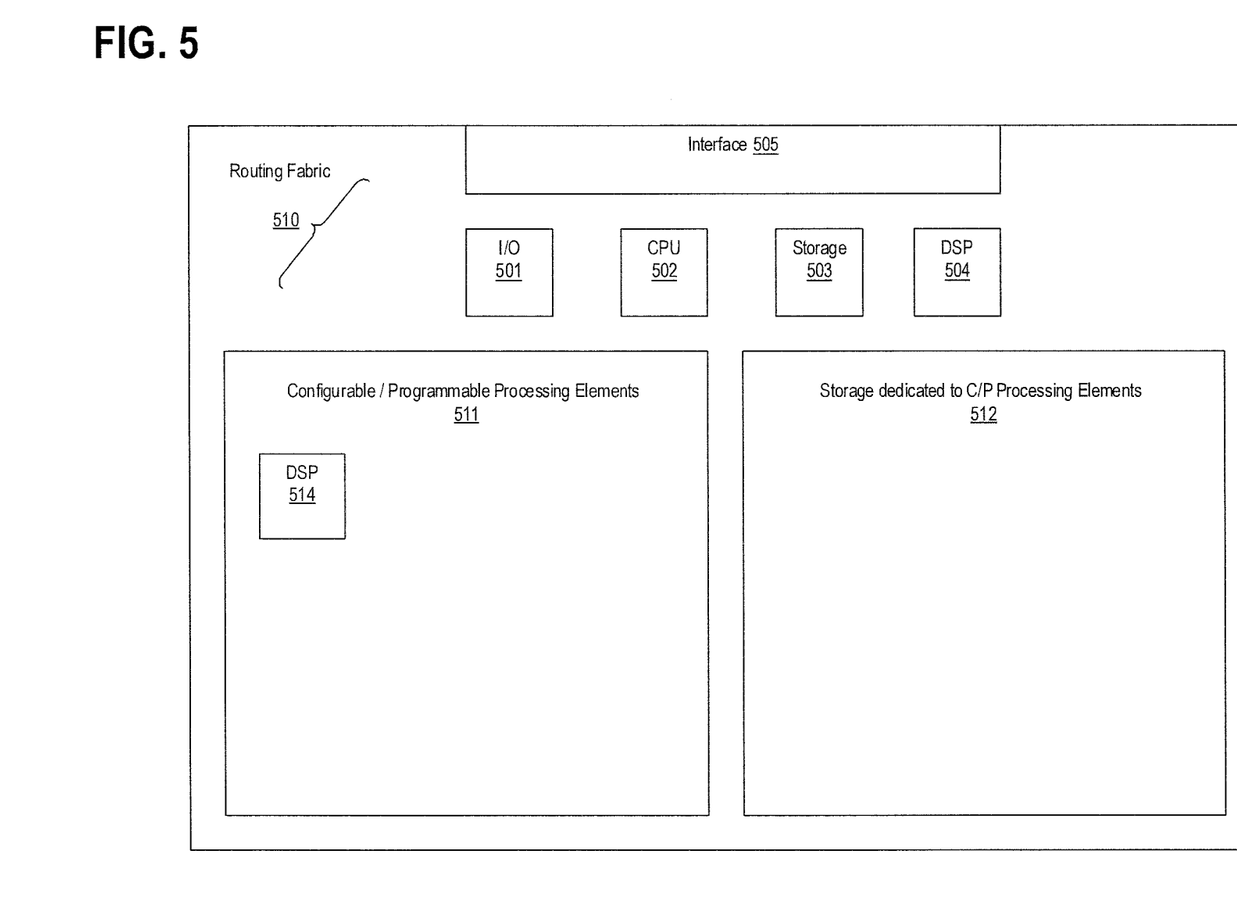
FIG. 5 depicts an example IC device, according to an embodiment.

FIG. 5 depicts an example IC device 500, with which a possible embodiment of the present invention may be implemented. IC device 500 may have an input/output (I/O) feature 501. I/O feature 501 receives input signals and routes them via routing fabric 510 to a central processing unit (CPU) 502, which functions with storage 503. I/O feature 501 also receives output signals from other component features of IC device 500 and may control a part of the signal flow over routing fabric 510. A digital signal processing (DSP) feature performs at least a function relating to digital signal processing. An interface 505 accesses external signals and routes them to I/O feature 501, and allows IC device 500 to export signals. Routing fabric 510 routes signals and power between the various component features of IC device 500.

Configurable and/or programmable processing elements (CPPE) 511, such as arrays of logic gates may perform dedicated functions of IC device 500, which in an embodiment may relate to deriving and processing media fingerprints that generally correspond to media content. Storage 512 dedicates sufficient memory cells for CPPE 511 to function efficiently. CPPE may include one or more dedicated DSP features 514.

5.0 Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method, comprising:
receiving a first audio stream and a second audio stream;
determining whether a first energy level for the first audio stream individually meets or exceeds an energy level threshold;
determining whether a second energy level for the second audio stream individually meets or exceeds the energy level threshold;
in response to determining that the first energy level for the first audio stream individually meets or exceeds the energy level threshold and determining that the second energy level for the second audio stream individually meets or exceeds the energy level threshold, computing a set of gains for at least one of the first audio stream and the second audio stream to create a dominance effect of the second audio stream over the first audio stream;
generating metadata comprising the set of gains for at least one of the first audio stream and the second audio stream;
generating an output audio signal comprising the first audio stream, the second audio stream, and the metadata comprising the set of gains;
wherein the method is performed by a computing device, which comprises a processor.

2. The method as recited in claim 1, wherein computing the set of gains includes:
receiving a dominance criterion of the second audio stream over the first audio stream;
wherein the set of gains is computed based on the dominance criterion of the second audio stream over the first audio stream.

3. The method as recited in claim 2, wherein the dominance criterion comprises a loudness ratio between the first audio stream and the second audio stream.

4. The method as recited in claim 2, wherein the dominance criterion comprises a power ratio between the first audio stream and the second audio stream.

5. The method as recited in claim 1, wherein the set of gains is derived under the constraint that the loudness of the combined first audio stream and second audio stream, after application of said set of gains, does not exceed the larger of the loudness values of the first audio stream and the second audio stream.

6. The method as recited in claim 1, wherein computing the set of gains includes:
   receiving an intelligibility criterion of the second audio;
   wherein the set of gains is computed such that the intelligibility of the second audio stream is urged above the intelligibility criterion.

7. The method as recited in claim 6, wherein the computation of the set of gains comprises deriving a measure of speech intelligibility of speech in the second audio stream.

8. The method as recited in claim 7, wherein the measure of speech intelligibility is a speech intelligibility index.

9. The method as recited in claim 1, further comprising:
   determining whether the first audio stream comprises speech;
   wherein the set of gains is based at least on the result of said determining.

10. The method as recited in claim 1, further comprising:
    determining whether the first audio stream comprises speech or non-speech content during an interval when both the first audio stream and the second audio stream are active;
    wherein the set of gains for the first interval is based at least on whether the first audio stream comprises speech or non-speech content during the interval.

11. The method as recited in claim 1, further comprising:
    determining a confidence level that the first audio stream comprises speech during an interval when both the first audio stream and the second audio stream are active;
    wherein the set of gains for the interval is based at least on the confidence level that the first audio stream comprises speech during the interval.

12. The method as recited in claim 1, wherein the set of gains is calculated based on frequency sub-bands, wherein a first set of gains associated with a first frequency sub-band is different than a second set of gains associated with a second frequency sub-band.

13. The method as recited in claim 12, further comprising:
    receiving a first dominance criterion for the first frequency sub-band, wherein the first set of gains is computed based on the first dominance criterion;
    receiving a second dominance criterion for the second frequency sub-band, wherein the second set of gains is computed based on the second dominance criterion.

14. The method as recited in claim 1, further comprising one or more of:
    transmitting the first audio stream, the second audio stream, and the metadata; or
    mixing the first audio stream and the second audio stream based on the metadata.

15. The method as recited in claim 1, wherein the set of gains is computed when the first audio stream and the second audio stream are active.

16. The method as recited in claim 1, further comprising detecting overlapping signal time intervals when both the first audio stream and the second audio stream are active.

17. The method as recited in claim 1, wherein the first audio stream comprises primary audio associated with media content, and wherein the second audio stream comprises descriptive audio associated with the media content.

18. The method as recited in claim 1, wherein the first audio stream comprises a first set of one or more channels in a multi-channel program, wherein the second audio stream comprises a second set of one or more channels in the multi-channel program.

19. A method for processing an encoded audio signal generated according to the method of claim 1, comprising:
    receiving the encoded audio signal;
    extracting, from the encoded audio signal, (a) the first audio stream, (b) the second audio stream, and (c) the metadata comprising the set of gains;
    decoding the first audio stream and the second audio stream; and
    mixing the first audio stream and the second audio stream based on the set of gains to create an output audio signal in which one of the first and second audio streams dominates the other of the first and second audio streams.

20. A non-transitory computer readable storage medium, comprising a set of instructions, which when executed by a processing or computing device cause, control or program the device to execute or perform a process, wherein the process comprises the steps of:
    receiving a first audio stream and a second audio stream;
    determining whether a first energy level for the first audio stream individually meets or exceeds an energy level threshold;
    determining whether a second energy level for the second audio stream individually meets or exceeds the energy level threshold;
    in response to determining that the first energy level for the first audio stream individually meets or exceeds the energy level threshold and determining that the second energy level for the second audio stream individually meets or exceeds the energy level threshold, computing a set of gains for at least one of the first audio stream and the second audio stream to create a dominance effect of the second audio stream over the first audio stream;
    generating metadata comprising the set of gains for at least one of the first audio stream and the second audio stream;
    generating an output audio signal comprising the first audio stream, the second audio stream, and the metadata comprising the set of gains.

21. An apparatus comprising:
    a processor; and
    a non-transitory computer readable storage medium, comprising a set of instructions, which when executed by the processor cause, control or program the apparatus, or the processor thereof, to perform a process that comprises the steps of:
    receiving a first audio stream and a second audio stream;
    determining whether a first energy level for the first audio stream individually meets or exceeds an energy level threshold;
    determining whether a second energy level for the second audio stream individually meets or exceeds the energy level threshold;
    in response to determining that the first energy level for the first audio stream individually meets or exceeds the energy level threshold and determining that the second energy level for the second audio stream individually meets or exceeds the energy level threshold, computing a set of gains for at least one of the first audio stream and the second audio stream to create a dominance effect of the second audio stream over the first audio stream;
    generating metadata comprising the set of gains for at least one of the first audio stream and the second audio stream;

generating an output audio signal comprising the first audio stream, the second audio stream, and the metadata comprising the set of gains.

22. A system, comprising:

means for receiving a first audio stream and a second audio stream;

means for determining whether a first energy level for the first audio stream individually meets or exceeds an energy level threshold;

means for determining whether a second energy level for the second audio stream individually meets or exceeds the energy level threshold;

means for computing a set of gains for at least one of the first audio stream and the second audio stream to create a dominance effect of the second audio stream over the first audio stream in response to determining that the first energy level for the first audio stream individually meets or exceeds the energy level threshold and determining that the second energy level for the second audio stream individually meets or exceeds the energy level threshold;

means for generating metadata comprising the set of gains for at least one of the first audio stream and the second audio stream;

means for generating an output audio signal comprising the first audio stream, the second audio stream, and the metadata comprising the set of gains.

23. An integrated circuit (IC) device, comprising:

a die;

an array of active devices disposed within the die; and a non-transitory storage medium, which is readable by one or more of the active components in the array and disposed within the die, wherein the component-readable non-transitory medium comprises a set of instructions, which when executed by the one or more active components cause, control, program or configure the IC device, the one or more active components in the array therein, or another set of active components of the array, to perform a process that comprises the steps of:

receiving a first audio stream and a second audio stream;

determining whether a first energy level for the first audio stream individually meets or exceeds an energy level threshold;

determining whether a second energy level for the second audio stream individually meets or exceeds the energy level threshold;

in response to determining that the first energy level for the first audio stream individually meets or exceeds the energy level threshold and determining that the second energy level for the second audio stream individually meets or exceeds the energy level threshold, computing a set of gains for at least one of the first audio stream and the second audio stream to create a dominance effect of the second audio stream over the first audio stream;

generating metadata comprising the set of gains for at least one of the first audio stream and the second audio stream;

generating an output audio signal comprising the first audio stream, the second audio stream, and the metadata comprising the set of gains.

24. The IC device as recited in claim 23, wherein the IC device comprises one or more of:

a digital signal processor (DSP);

an audio processor;

a field programmable gate array (FPGA);

an application specific IC (ASIC);

a microcontroller; or an IC device that comprises:

a processor, which comprises the active devices array; and the component readable non-transitory storage medium.

* * * * *